(12) United States Patent
Paeng et al.

(10) Patent No.: US 12,261,282 B2
(45) Date of Patent: Mar. 25, 2025

(54) ELECTRODE FOR SECONDARY BATTERY AND METHOD OF MANUFACTURING ELECTRODE FOR SECONDARY BATTERY

(71) Applicant: LG Energy Solution, Ltd., Seoul (KR)

(72) Inventors: Ki Hoon Paeng, Daejeon (KR); Hyungkyun Yu, Daejeon (KR); Sang Myeon Lee, Daejeon (KR); Hyung Seok Han, Daejeon (KR); Jaewon Moon, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 636 days.

(21) Appl. No.: 17/609,642

(22) PCT Filed: Nov. 5, 2020

(86) PCT No.: PCT/KR2020/015433
§ 371 (c)(1),
(2) Date: Nov. 8, 2021

(87) PCT Pub. No.: WO2021/112418
PCT Pub. Date: Jun. 10, 2021

(65) Prior Publication Data
US 2022/0216455 A1   Jul. 7, 2022

(30) Foreign Application Priority Data

Dec. 5, 2019 (KR) .................. 10-2019-0160898
Oct. 30, 2020 (KR) .................. 10-2020-0143369

(51) Int. Cl.
*H01M 4/04* (2006.01)
*C21D 7/06* (2006.01)

(52) U.S. Cl.
CPC ............ *H01M 4/0435* (2013.01); *C21D 7/06* (2013.01); *H01M 4/0404* (2013.01); *H01M 4/0471* (2013.01)

(58) Field of Classification Search
CPC .......... H01M 10/613; H01M 10/0525; H01M 10/6554; H01M 50/209; H01M 50/271;
(Continued)

(56) References Cited

U.S. PATENT DOCUMENTS 6,197,133 B1   3/2001   Unternahrer et al.
8,637,189 B2   1/2014   Okabe et al.
(Continued)

FOREIGN PATENT DOCUMENTS

CN   102780006 A   11/2012
CN   108405716 A    8/2018
(Continued)

OTHER PUBLICATIONS

Extended European Search Report for Application No. 20897342.0 dated Sep. 20, 2022. 5 pgs.
(Continued)

*Primary Examiner* — Abdullah A Riyami
*Assistant Examiner* — Nader J Alhawamdeh
(74) *Attorney, Agent, or Firm* — Lerner David LLP (57) ABSTRACT

The present disclosure relates to an electrode for a secondary battery and a method of manufacturing an electrode for a secondary battery. The electrode for a secondary battery according to one embodiment of the present disclosure includes an electrode current collector including a coated portion and an uncoated portion, an active material layer located on the coated portion of the electrode current collector, a dimple portion formed on the surface of the uncoated portion, and a plastic deformation layer formed on the surface of the dimple portion.

7 Claims, 6 Drawing Sheets

(58) Field of Classification Search
CPC .......... H01M 50/289; H01M 2220/20; H01M 50/24; H01M 10/04; H01M 2220/10; Y02P 70/50; Y02E 60/10
See application file for complete search history.

(56) References Cited

U.S. PATENT DOCUMENTS

| | | | |
|---|---|---|---|
| 2008/0233476 A1* | 9/2008 | Jeong | H01M 4/661 427/532 |
| 2011/0039138 A1 | 2/2011 | Jeong et al. | |
| 2012/0217235 A1 | 8/2012 | Mathai et al. | |
| 2012/0288756 A1 | 11/2012 | Kim | |
| 2015/0093630 A1* | 4/2015 | Han | H01M 50/103 429/163 |
| 2016/0005698 A1 | 1/2016 | Kim | |
| 2017/0069579 A1 | 3/2017 | Kim | |
| 2019/0386286 A1* | 12/2019 | Kim | H01M 50/534 |
| 2020/0067103 A1* | 2/2020 | Han | H01M 4/661 |
| 2022/0216455 A1* | 7/2022 | Paeng | H01M 4/667 |

FOREIGN PATENT DOCUMENTS

| | | | |
|---|---|---|---|
| JP | 2001357840 A | | 12/2001 |
| JP | 2005177774 A | | 7/2005 |
| JP | 2005243636 A | * | 9/2005 ........ H01M 10/0525 |
| JP | 2006012467 A | | 1/2006 |
| JP | 2010042957 A | | 2/2010 |
| JP | 4642962 B2 | | 3/2011 |
| JP | 2012079592 A | | 4/2012 |
| JP | 2013105585 A | | 5/2013 |
| JP | 2016062864 A | | 4/2016 |
| JP | 2018029018 A | * | 2/2018 |
| KR | 100823198 B1 | | 4/2008 |
| KR | 20110017761 A | | 2/2011 |
| KR | 20120017399 A | | 2/2012 |
| KR | 20160005857 A | | 1/2016 |
| KR | 20160132569 A | | 11/2016 |
| KR | 101690890 B1 | | 12/2016 |
| KR | 20180115152 A | | 10/2018 |

OTHER PUBLICATIONS

Search Report dated Dec. 19, 2023 from the Office Action for Chinese Application No. 202080030002.9 issued Dec. 22, 2023, 2 pages.

Liblonsky, K.N. "Mechanical Parts", Jul. 1992, This book is translated based on the 1985 edition of Mechanical Parts by Professor K.N. Liblonsky (Soviet Union). The book is divided into four parts, totaling 42 chapters. The editor in charge of this book is Ma Shengming. [English translation of Abstract only].

International Search Report for PCTKR2020015433 dated Mar. 5, 2021, 2 pgs.

* cited by examiner

ELECTRODE FOR SECONDARY BATTERY AND METHOD OF MANUFACTURING ELECTRODE FOR SECONDARY BATTERY

CROSS-REFERENCE TO RELATED APPLICATIONS

The present application is a national stage entry under 35 U.S.C. § 371 of International Application No. PCT/KR2020/015433 filed on Nov. 5, 2020, which claims priority from Korean Patent Application No. 10-2019-0160898 filed on Dec. 5, 2019 and Korean Patent Application No. 10-2020-0143369 filed on Oct. 30, 2020, all the disclosures of which are incorporated herein by reference.

TECHNICAL FIELD

The present disclosure relates to an electrode for a secondary battery and a method of manufacturing the electrode for a secondary battery, and more particularly, to a rolling device and a rolling method for a secondary battery that enhances a resistance against stress of non-coated portion.

BACKGROUND ART

The secondary battery can be formed by inserting an electrode assembly composed of a positive electrode plate, a negative electrode plate, and a separator into a case, and then sealing the can. A positive electrode plate or a negative electrode plate (hereinafter, referred to as "electrode plate") can be configured by coating an active material slurry onto a positive conductive current collector or a negative conductive current collector to a predetermined thickness, interposing a separator between the positive electrode conductive current collector and the negative electrode conductive current collector, and winding the plate in a jelly-roll type many times or laminating it in a plurality of layers to form an electrode assembly.

The electrode plate may be formed of an active material coating layer coated with an active material slurry and a non-coated portion. The active material coating layer can include a roll process for increasing the adhesiveness to the electrode current collector and increasing the volume density of the active material. The rolled electrode plate can, after drying, be used by being passed through a cutter having a certain width and cut into a predetermined size.

The roll process has a problem that a compression deviation occurs due to a difference in thickness between the coating layer and the non-coated portion at the time of rolling the electrode plate. Due to such a deviation, unbalanced plastic deformation of the electrode current collector may occur, thereby causing a residual stress. In particular, the tensile residual stress may cause a reduction of fatigue durability and a reduction of fracture strength of components.

Figure 1:
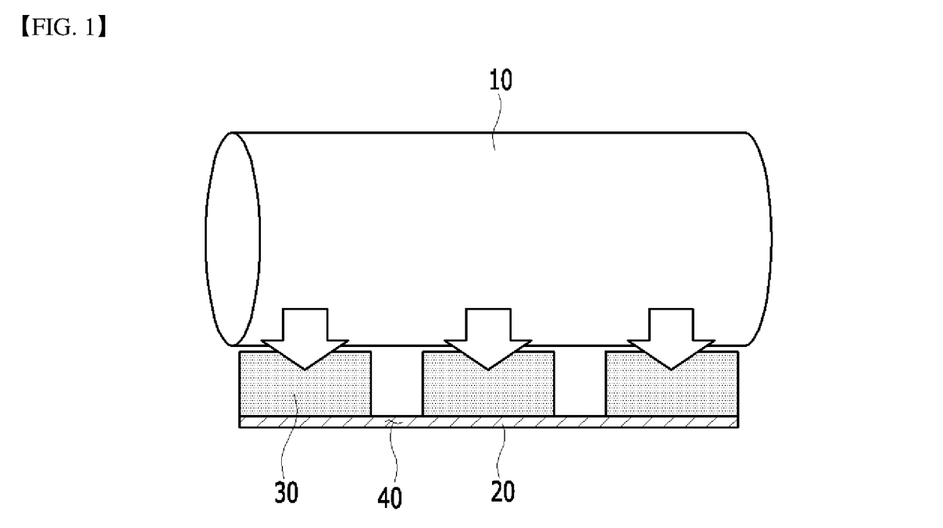
FIG. 1 is a schematic diagram showing a roll process using a conventional rolling device.
Figure 2:
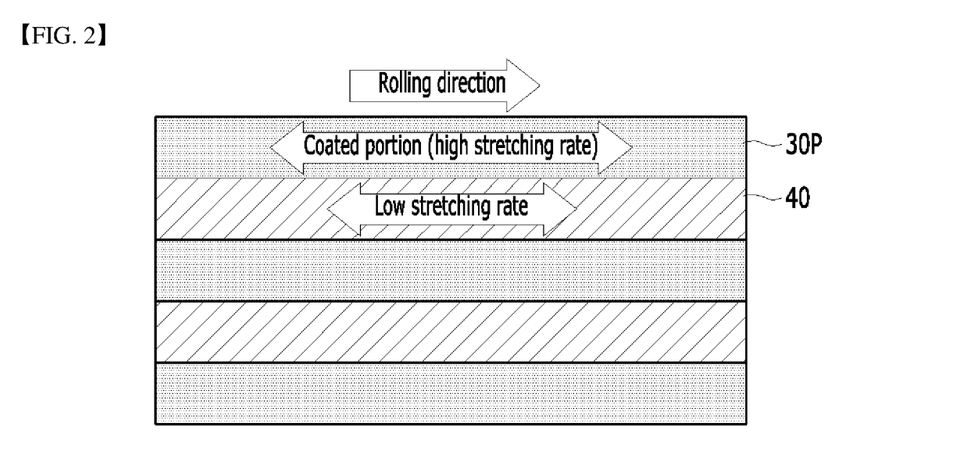
FIG. 2 is a plan view showing an electrode plate after rolling.

FIG. 1 is a schematic diagram showing a roll process using a conventional rolling device. FIG. 2 is a plan view showing an electrode plate after rolling.

Referring to FIG. 1, a roll process of rolling a coated layer 30 and a non-coated portion 40 formed on an electrode current collector 20 by a rolling roll 10 may be performed. At this time, the pressure is concentrated on the coated layer 30, and as shown in FIG. 2, a difference occurs between the degree of stretching of the coated portion 30P and the degree of stretching of the non-coated portion 40, and wrinkles may be generated in the non-coated portion 40. Due to the wrinkles of the non-coated portion 40 generated during rolling, process defects such as electrode disconnection may occur in a subsequent process. In particular, while a high tensile residual stress remains at a boundary surface between the coated portion 30P and the non-coated portion 40, they can continuously receive weak stress due to the contraction and expansion of the electrode, and may become vulnerable to fracture.

DETAILED DESCRIPTION OF THE INVENTION

Technical Problem

It is an object of the present disclosure to provide an electrode for secondary batteries that increase a resistance against stress of the non-coated portion, and a method of manufacturing an electrode for a secondary battery.

However, the problem to be solved by embodiments of the present disclosure is not limited to the above-described problems, and can be variously expanded within the scope of the technical idea included in the present disclosure.

Technical Solution

According to one embodiment of the present disclosure, there is provided a method of manufacturing an electrode for a secondary battery, comprising the steps of: coating an active material onto an electrode current collector to form a coated portion and an uncoated portion, and applying a compressive residual stress to the surface of the uncoated portion, wherein the step of applying the compressive residual stress to the surface of the uncoated portion comprises a step of performing a peening process on the surface of the uncoated portion.

The step of applying the compressive residual stress to the surface of the uncoated portion is performed before a roll process performed along the moving direction of the electrode current collector, and the roll process may include at least one of a process of rolling a coated portion and an uncoated portion of the electrode current collector and a process of notching a coated portion and an uncoated portion of the electrode current collector.

The step of applying the compressive residual stress to the surface of the uncoated portion may include a step of performing a shot peening process.

The step of performing a shot peening process may include a step of forming a dimple portion on the surface of the uncoated portion.

A plastic deformation layer is formed on the surface of the dimple portion, so that the plastic deformation layer has a residual compressive stress, and the inside of the uncoated portion located outside the plastic deformation layer has a tensile residual stress.

The step of applying the compressive residual stress to the surface of the uncoated portion may include a step of performing an ultrasonic peening process.

The step of performing an ultrasonic peening process may include a step of forming a dimple portion on the surface of the uncoated portion.

The method of manufacturing an electrode for a secondary battery may further include a step of heat-treating the electrode current collector, after the step of performing a peening process on the surface of the uncoated portion.

According to another embodiment of the present disclosure, there is provided an electrode for a secondary battery comprising: an electrode current collector including a coated portion and an uncoated portion, and an active material layer located on the coated portion of the electrode current collector, wherein a dimple portion is formed on the surface of the uncoated portion, and a plastic deformation layer is formed on the surface of the dimple portion.

The electrode for a secondary battery further includes a plastic deformation layer located on the surface of the dimple portion, wherein the plastic deformation layer may have a compressive residual stress, and the inside of the uncoated portion located outside the plastic deformation layer has a tensile residual stress.

Advantageous Effects

According to the embodiments of the present disclosure, by applying a compressive residual stress to the surface of an uncoated portion before electrode rolling and/or notching process, the fatigue durability and fracture strength of the material can be improved and the resistance against stress can be enhanced. Therefore, it is possible to reduce the occurrence of fracture due to fatigue fracture at the boundary surface between the electrode and the uncoated portion.

DETAILED DESCRIPTION OF THE EMBODIMENTS

Hereinafter, various embodiments of the present disclosure will be described in detail with reference to the accompanying drawings so that those skilled in the art can easily implement them. The present disclosure may be modified in various different ways, and is not limited to the embodiments set forth herein.

Portions that are irrelevant to the description will be omitted to clearly describe the present disclosure, and like reference numerals designate like elements throughout the specification.

Further, in the figures, the size and thickness of each element are arbitrarily illustrated for convenience of description, and the present disclosure is not necessarily limited to those illustrated in the figures. In the figures, the thickness of layers, regions, etc. are exaggerated for clarity. In the figures, for convenience of description, the thicknesses of some layers and regions are shown to be exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed on the upper end of the reference portion toward the opposite direction of gravity.

Further, throughout the specification, when a portion is referred to as "including" a certain component, it means that it can further include other components, without excluding the other components, unless otherwise stated.

Further, throughout the specification, when referred to as "planar", it means when a target portion is viewed from the upper side, and when referred to as "cross-sectional", it means when a target portion is viewed from the side of a cross section cut vertically.

Figure 3:
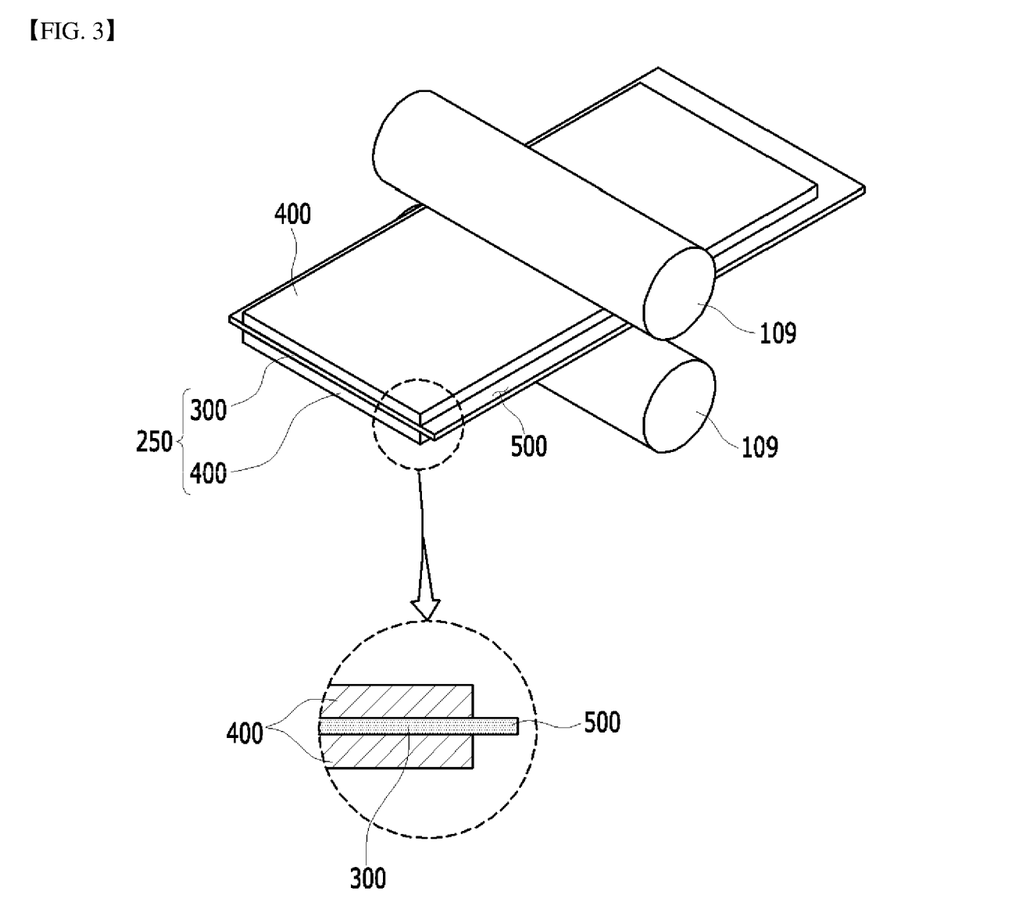
FIG. 3 is a perspective view showing a rolling device according to one embodiment of the present disclosure.

FIG. 3 is a perspective view showing a rolling device according to one embodiment of the present disclosure.

Referring to FIG. 3, a method of manufacturing an electrode for a secondary battery according to one embodiment of the present disclosure includes the steps of: coating an active material onto an electrode current collector 300 to form a coated portion 400 and an uncoated portion 500, and applying a compressive residual stress to the surface of the uncoated portion 500. At this time, the step of applying the compressive residual stress to the surface of the uncoated portion 500 includes a step of performing a peening process on the surface of the uncoated portion 500. When performing a peening process on the surface of the uncoated portion 500, it is desirable to minimize a physical deformation on the surface of the uncoated portion 500. That is, a compressive residual stress must be applied to the surface of the uncoated portion 500 by an action such as quenching through a peening process, which is different from applying an elongation force. According to this embodiment, there is no physical change on the surface of the uncoated portion 500 through the peening process, or even if there is a physical change, the change may occur uniformly.

The step of applying a compressive residual stress to the surface of the uncoated portion 500 is performed before a roll process performed along the moving direction of the electrode current collector 300, and the roll process may include at least one of a process of rolling a coated portion 400 and an uncoated portion 500 of the electrode current collector 300 and a process of notching a coated portion 400 and an uncoated portion 500 of the electrode current collector 300.

Figure 4:
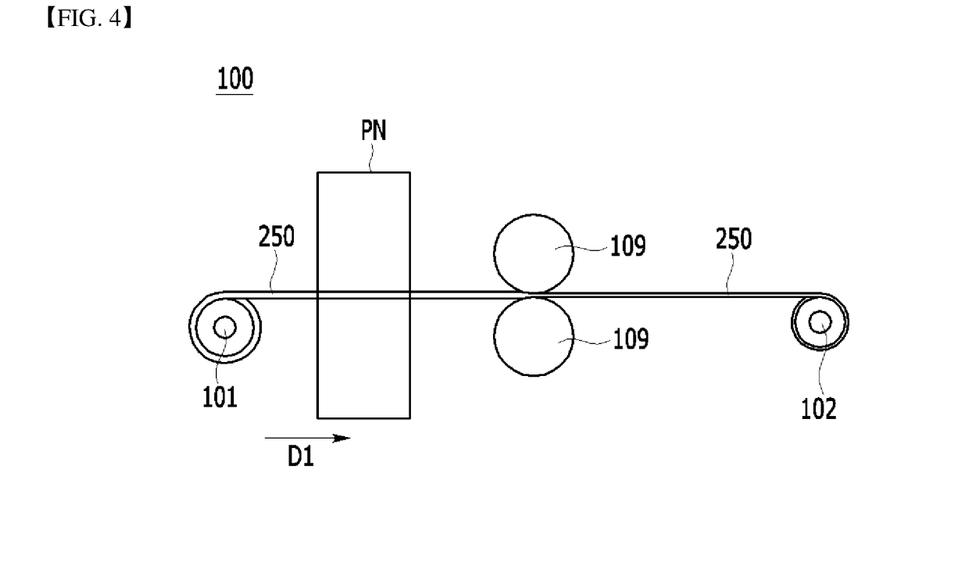
FIG. 4 is a diagram schematically showing a state in which the rolling device of FIG. 3 is viewed from the front.
Figure 5:
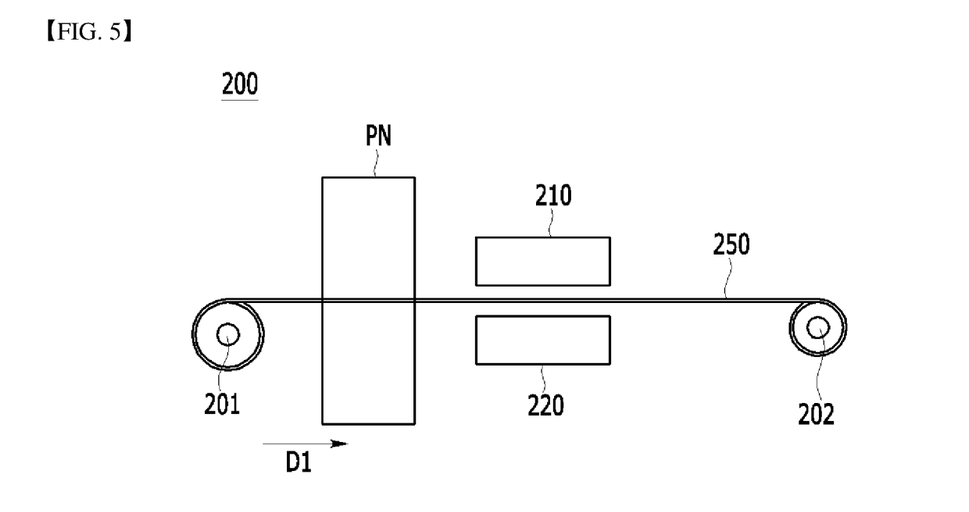
FIG. 5 is a schematic diagram showing a notching device according to one embodiment of the present disclosure.

FIG. 4 is a diagram schematically showing a state in which the rolling device of FIG. 3 is viewed from the front. FIG. 5 is a schematic diagram showing a notching device according to one embodiment of the present disclosure.

Referring to FIGS. 3 and 4, the electrode rolling device 100 according to the embodiment of the present disclosure includes a first roller 101 which unwinds an electrode plate 250 having a coated portion 400 on which a coating material is formed on the electrode current collector 300 and an uncoated portion 500 corresponding to a non-coated portion, a second roller 102 which winds the electrode plate 250, and a rolling roll 109 which is located between the first roller 101 and the second roller 102 and rolls the coated portion 400 and the uncoated portion 500 of the electrode plate 250 along the moving direction of the electrode plate 250. The uncoated portion 500 may refer to a region excluding the coated portion 400 formed on the electrode current collector 300.

The first roller 101 provides the electrode plate 250 to be rolled to the rolling device 100, and moves the electrode plate 250 in a direction of arrow D1 of FIG. 4 in accordance with the clockwise rotation. The electrode plate 250 unwound by the first roller 101 passes between the rolling rolls 109 while moving along the direction of the arrow. The rolling rolls 109 are located on both sides with respect to the electrode plate 250, respectively, and the electrode plate 250 that has passed between the two rolling rolls 109 is pressed. After that, the electrode plate 250 that has passed between the two rolling rolls 109 is rewound on the second roller 102.

The method of manufacturing an electrode for a secondary battery according to the embodiment of the present disclosure includes a step of performing a peening process, before the electrode plate 250 having the coated portion 400 and the uncoated portion 500 is unwinded and then rolled by the rolling roll 109. The peening process may be performed by a peening device PN located between the first roller 101 and the rolling roll 109 in the electrode rolling device 100 according to this embodiment. The peening process may apply a compressive residual stress to the uncoated portion 500 according to this embodiment.

Referring to FIG. 5, in a modified embodiment, the method of manufacturing an electrode for a secondary battery according to the embodiment of the present disclosure includes a step of performing a shot peening process, before the electrode plate 250 having the coated portion 400 and the uncoated portion 500 is unwinded and then notched by an upper mold 210 and a lower mold 220 for notching. The peening process may be performed by a peening device PN located between the first roller 201 and the notching molds 210 and 220 in the electrode notching device 200 according to the present embodiment.

Figure 6:
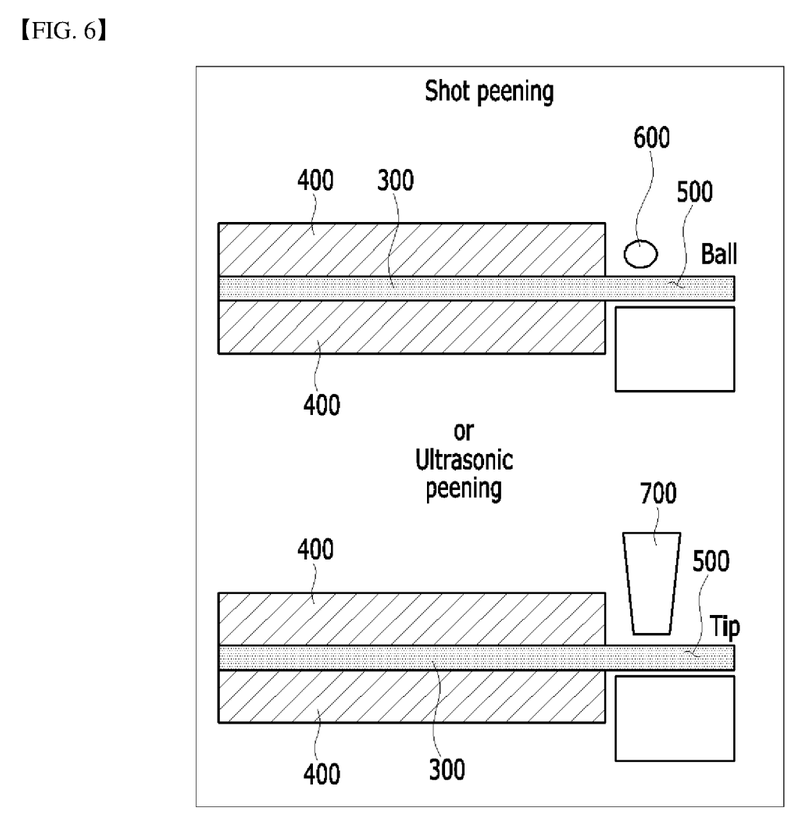
FIG. 6 is a schematic cross-sectional view showing a peening process of FIGS. 4 and 5.
Figure 7:
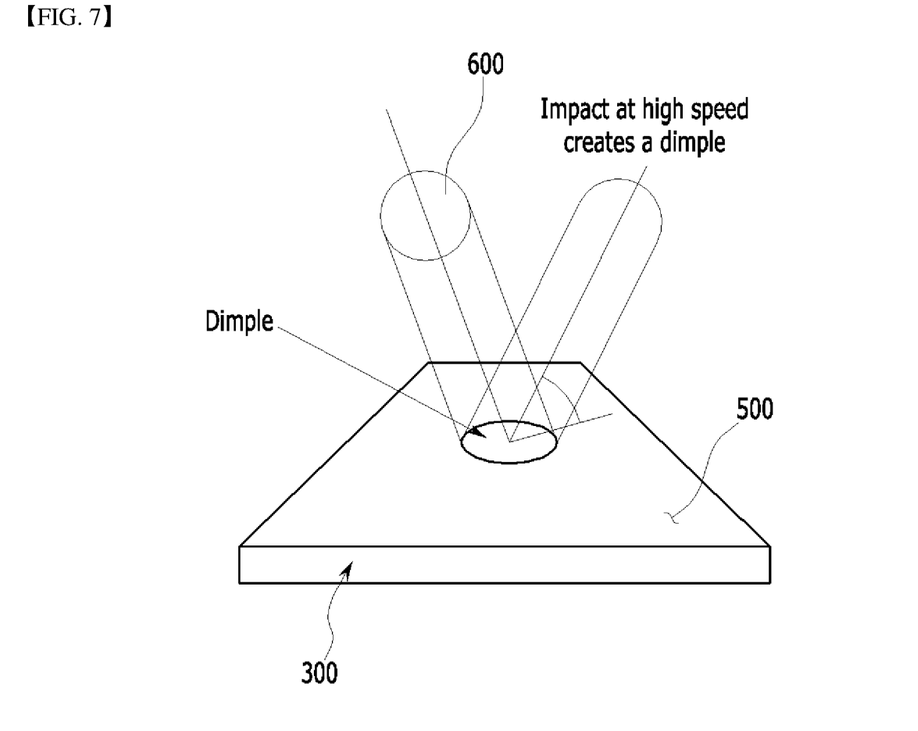
FIG. 7 is a perspective view showing a shot peening process according to an embodiment of the present disclosure.
Figure 8:
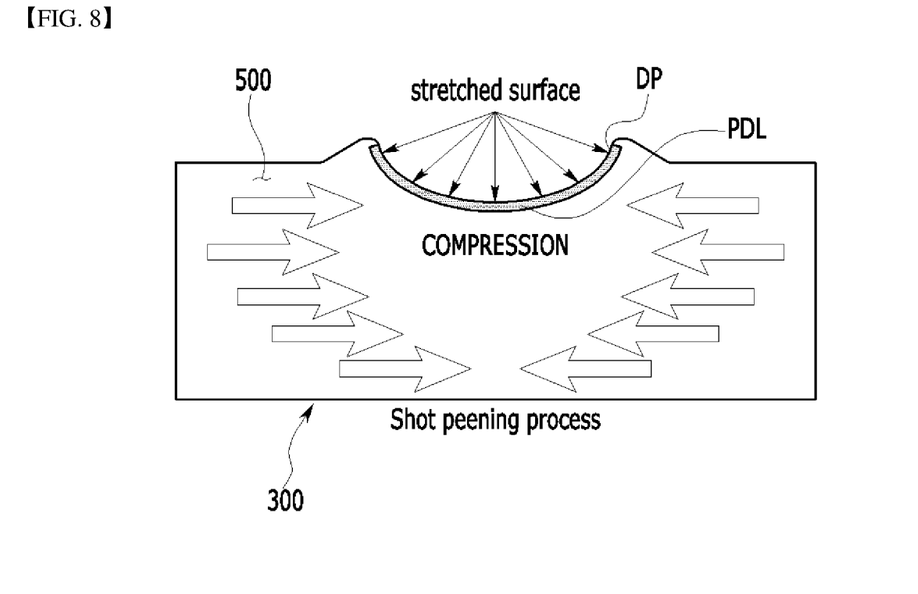
FIG. 8 is a cross-sectional view showing a state in which a dimple portion is formed by shot peening of FIG. 7.

FIG. 6 is a schematic cross-sectional view showing a peening process of FIGS. 4 and 5. FIG. 7 is a perspective view showing a shot peening process according to an embodiment of the present disclosure. FIG. 8 is a cross-sectional view showing a state in which a dimple portion is formed by shot peening of FIG. 7.

Referring to FIG. 6, the step of applying a compressive residual stress to the surface of the uncoated portion 500 according to the present embodiment may include a step of performing a shot peening process or a step of performing an ultrasonic peening process. In the following, the step of performing the shot peening process will be mainly described.

Referring to FIGS. 6 to 8, a shot ball 600 may be thrown onto the surface of the uncoated portion 500 at high speed to hammer the surface of the electrode current collector 300. The shot ball 600 may be formed of a steel ball such as stainless steel. Specifically, in the shot peening process, the shot ball 600 collides with the surface of the uncoated portion 500 at high speed, and a kinetic energy of the shot ball 600 instantaneously causes a plastic deformation on the surface of the material, and the shot ball 600 separates from the surface. At this time, the uncoated portion 500 is formed with a dimple portion DP having an indented shape. According to this embodiment, a thin plastic deformation layer PDL is formed on the surface of the dimple portion DP, and the plastic deformation layer PDL may have a compressive residual stress. In contrast, the inside of the uncoated portion 500 located outside the plastic deformation layer PDL may have a tensile residual stress. Thus, a force to maintain the stretched surface in a state before stretching is applied to the plastic deformation layer PDL according to this embodiment, and a compressive residual stress and tensile residual stress are formed on the surface and inside of the uncoated portion 500 on which the dimple portion DP is formed, respectively, thereby achieving equilibrium. By leaving a compressive residual stress on the surface of the uncoated portion 500 by this shot peening process, the compressive residual stress is gradually canceled when repetitive tension is applied, and the fatigue life can be extended until the compressive residual stress disappears.

The compressive residual stress and tensile residual stress described above can be interpreted as cosine values of the residual stress measured using a residual stress tester.

Referring again to FIG. 6, in a modified embodiment, the step of applying a compressive residual stress to the surface of the uncoated portion 500 may include a step of performing an ultrasonic peening process. In the ultrasonic peening process, an ultrasonic device 700 is disposed on the upper end of the uncoated part 500, so that ultrasonic waves collide with the surface of the uncoated part 500 at high speed, thereby causing plastic deformation. Specifically, in the ultrasonic peening process, the compressive residual stress can be controlled while ultrasonic energy is transmitted to the surface of the uncoated portion 500, and high and low cycle fatigue can be improved. The ultrasonic peening process may be performed while controlling the altitude of the ultrasonic device 700 shown in FIG. 6. Through such an altitude control, the surface roughness of the uncoated portion 500 may be controlled.

The step of performing an ultrasonic peening process may replace the step of performing the above-described shot peening process. Even in the step of performing the ultrasonic peening process, a dimple portion may be formed on the surface of the uncoated portion 500, and a plastic deformation layer having a compressive residual stress is formed on the surface of the dimple portion, and the inside of the uncoated portion located outside the plastic deformation layer may have a tensile residual stress. In the ultrasonic peening process, the physical deformation on the surface of the uncoated portion 500 may be relatively small compared to the above-described shot peening.

Figure 9:
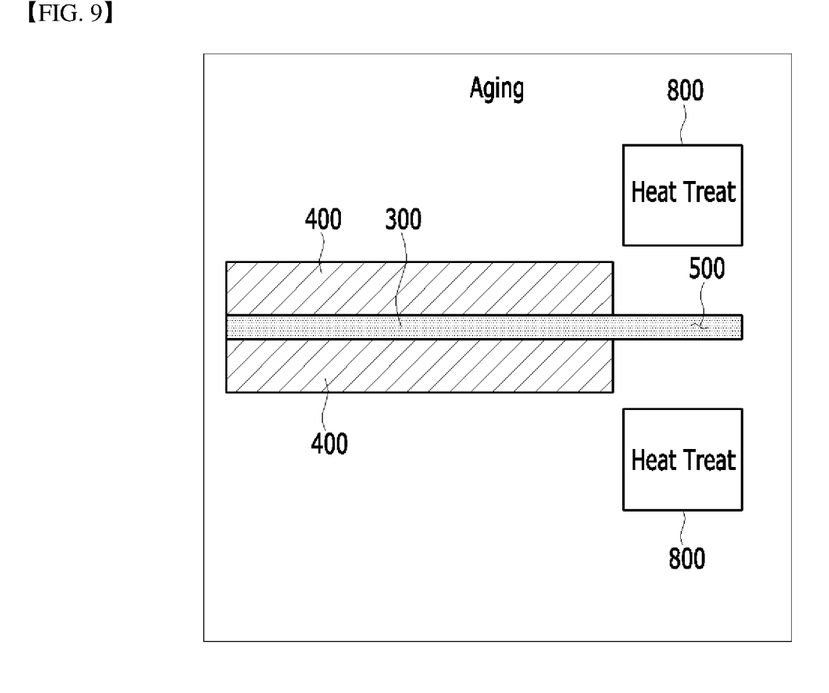
FIG. 9 is a schematic cross-sectional view showing an aging process according to an embodiment of the present disclosure.

FIG. 9 is a schematic cross-sectional view showing an aging process according to an embodiment of the present disclosure.

Referring to FIG. 9, the method of manufacturing an electrode for a secondary battery according to the embodiment of the present disclosure may include a step of heat-treating the electrode current collector 300 after performing a peening process on the surface of the uncoated portion 500. In the step of heat-treating the electrode current collector 300, a heat treatment apparatus 800 is disposed on the upper end of the uncoated part 500 so that ultrasonic waves collide with the surface of the uncoated part 500 at high speed, thereby causing plastic deformation. When aging such as heat treatment is performed in addition to the above-mentioned peening process, a compressive residual stress may be further generated on the surface of the electrode current collector 300. Accordingly, the level at which unbalanced plastic deformation occurs due to stress during rolling can be alleviated, and the level of tensile residual stress generated on the surface can be significantly alleviated.

According to the embodiment of the present disclosure, by applying a compressive residual stress of the electrode current collector 300 through a peening process, the electrode current collector 300 can be heat-treated in a state in which the fracture strength and fatigue durability are enhanced, thereby manufacturing an electrode for a secondary battery in which the internal grain of the electrode current collector 300 is stabilized. At this time, the heat treatment temperature can be set to a temperature and time within a range in which a large change in the physical properties of the material does not occur.

Although the preferred embodiments of the present disclosure have been described in detail above, the scope of the present disclosure is not limited thereto, and various modifications and improvements of those skilled in the art using the basic concepts of the present disclosure defined in the following claims also belong to the scope of rights.

DESCRIPTION OF REFERENCE NUMERALS

300: electrode current collector
400: coated portion
500: uncoated portion
600: shot ball
DP: dimple portion
PDL: plastic deformation layer

The invention claimed is:

1. A method of manufacturing an electrode for a secondary battery, comprising the steps of:
coating an active material onto an electrode current collector to form a coated portion and an uncoated portion, and applying a compressive residual stress to a surface of the uncoated portion, wherein the step of applying the compressive residual stress to the surface of the uncoated portion comprises a step of performing a shot peening process on the surface of the uncoated portion; wherein the step of performing the shot peening process comprises a step of forming a dimple portion on the surface of the uncoated portion; wherein a plastic deformation layer is formed on a surface of the dimple portion, so that the plastic deformation layer has a residual compressive stress, and the inside of the uncoated portion located outside the plastic deformation layer has a tensile residual stress.

2. The method of manufacturing an electrode for a secondary battery according to claim 1,
wherein the step of applying the compressive residual stress to the surface of the uncoated portion is performed before a roll process performed along a moving direction of the electrode current collector, and the roll process comprises at least one of a process of rolling the coated portion and the uncoated portion of the electrode current collector or a process of notching the coated portion and the uncoated portion of the electrode current collector.

3. The method of manufacturing an electrode for a secondary battery according to claim 2,
which further comprises a step of heat-treating the electrode current collector, after the step of performing the shot peening process on the surface of the uncoated portion.

4. A method of manufacturing an electrode for a secondary battery comprising the steps of:
coating an active material onto an electrode current collector to form a coated portion and an uncoated portion, and applying a compressive residual stress to a surface of the uncoated portion, wherein the step of applying the compressive residual stress to the surface of the uncoated portion comprises a step of performing an ultrasonic peening process on the surface of the uncoated portion; wherein the step of performing the ultrasonic peening process comprises a step of forming a dimple portion on the surface of the uncoated portion; wherein a plastic deformation layer is formed on a surface of the dimple portion, so that the plastic deformation layer has a residual compressive stress, and the inside of the uncoated portion located outside the plastic deformation layer has a tensile residual stress.

5. The method of manufacturing an electrode for a secondary battery according to claim 4,
wherein the step of applying the compressive residual stress to the surface of the uncoated portion is performed before a roll process performed along a moving direction of the electrode current collector, and the roll process comprises at least one of a process of rolling the coated portion and the uncoated portion of the electrode current collector or a process of notching the coated portion and the uncoated portion of the electrode current collector.

6. The method of manufacturing an electrode for a secondary battery according to claim 5,
which further comprises a step of heat-treating the electrode current collector, after the step of performing the ultrasonic peening process on the surface of the uncoated portion.

7. An electrode for a secondary battery comprising:
an electrode current collector including a coated portion and an uncoated portion,
an active material layer located on the coated portion of the electrode current collector, and
a dimple portion formed on a surface of the uncoated portion of the electrode current collector,
which further comprises a plastic deformation layer located on a surface of the dimple portion, wherein the plastic deformation layer has a compressive residual stress, and the inside of the uncoated portion located outside the plastic deformation layer has a tensile residual stress.

* * * * *